W. J. WALKER.
BOLL WEEVIL DESTROYER.
APPLICATION FILED SEPT. 14, 1917.
1,271,397.
Patented July 2, 1918.
2 SHEETS—SHEET 2.
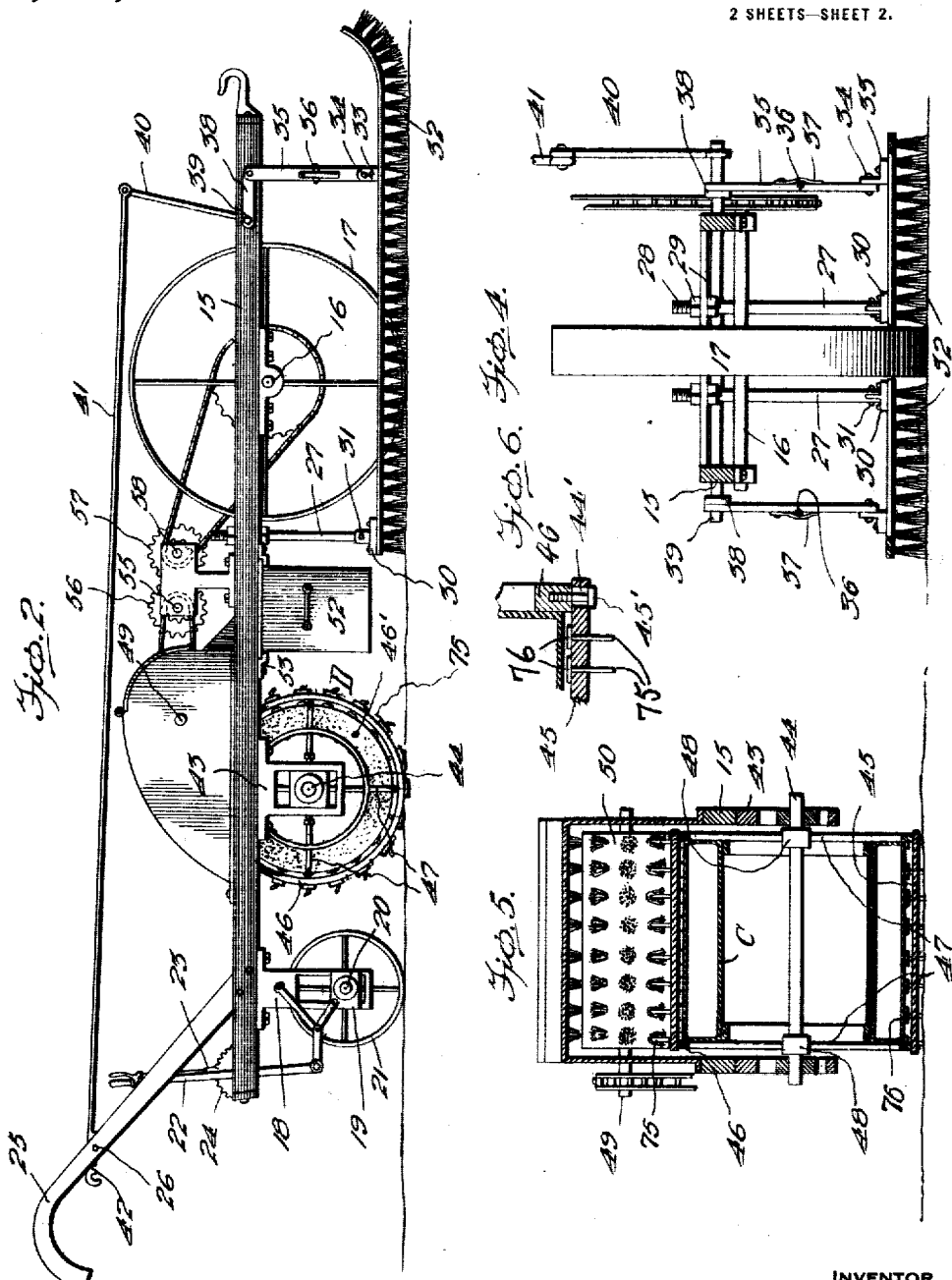
INVENTOR
W. J. Walker.
BY Victor J. Evans
ATTORNEY

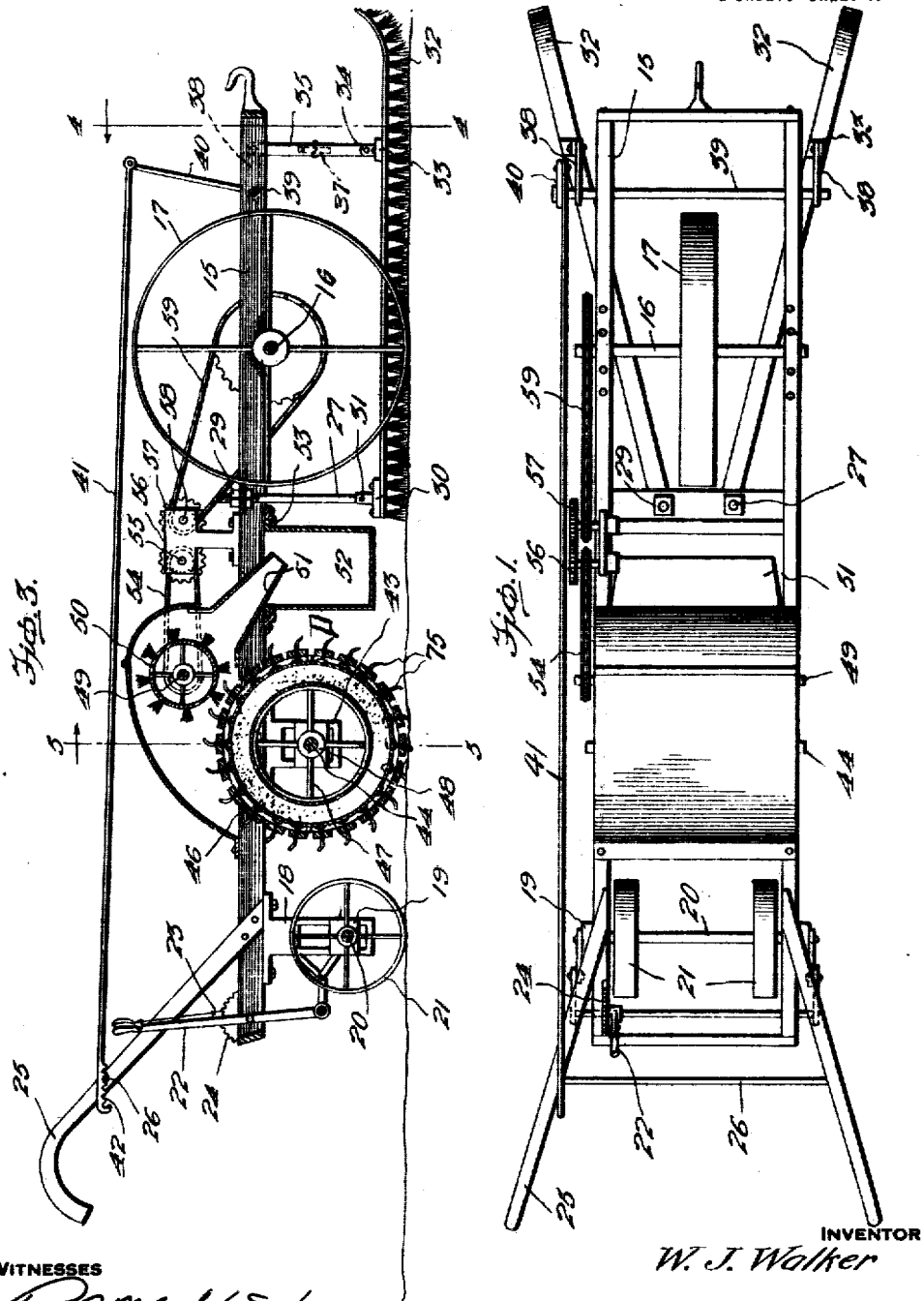

UNITED STATES PATENT OFFICE.

WILLIAM J. WALKER, OF SYLVANIA, GEORGIA.

BOLL-WEEVIL DESTROYER.

1,271,397.  Specification of Letters Patent.  Patented July 2, 1918.

Application filed September 14, 1917. Serial No. 191,445.

*To all whom it may concern:*

Be it known that I, WILLIAM J. WALKER, a citizen of the United States, residing at Sylvania, in the county of Screven and State of Georgia, have invented new and useful Improvements in Boll-Weevil Destroyers, of which the following is a specification.

This invention relates to devices for destroying boll weevils and it has particular reference to that class of devices which are provided with means for gathering the punctured squares, infested leaves and the like which are dropped on the ground so that the same may be subsequently destroyed.

The invention has for its object to provide a device of simple and improved construction including movably supported sweepers or gathering elements whereby the infested squares and leaves will be gathered so as to lie in the path of a revolving cylinder provided with teeth or prongs whereby the squares and leaves will be picked up and carried to a receptacle from which they may be subsequently removed and destroyed.

A further object of the invention is to simplify and improve the construction and operation of the revolving drum or cylinder having the teeth or prongs for picking up the punctured squares and leaves.

A further object of the invention is to simplify and improve the construction, arrangement and operation of the detailed parts of the device.

With these and other ends in view which will readily appear as the nature of the invention is better understood, the same consists in the improved construction and novel arrangement and combination of parts which will be hereinafter fully described and particularly pointed out in the claims.

In the accompanying drawing has been illustrated a simple and preferred form of the invention, it being, however, understood that no limitation is necessarily made to the precise structural details therein exhibited, but that changes, alterations and modifications within the scope of the claims may be resorted to when desired.

In the drawing,—

Figure 1 is a top plan view of the device constructed in accordance with the invention.

Fig. 2 is a side elevation of the same.

Fig. 3 is a longitudinal vertical sectional view.

Fig. 4 is a transverse sectional view taken on the line 4—4 in Fig. 3.

Fig. 5 is a transverse sectional view taken on the line 5—5 in Fig. 3.

Fig. 6 is a sectional detail view illustrating the preferred construction of the picker drum.

Corresponding parts in the several figures are denoted by like characters of reference.

The frame 15 of the improved machine is supported at its forward end on an axle 16 having a ground wheel 17 which also constitutes the power wheel of the device. The rearward end of the frame is provided with bearing members 18 supporting vertically slidable boxes 19 wherein the rear axle 20 is mounted, said axle having ground wheels 21. The boxes 19 are operatively connected with a hand lever 22 whereby said boxes may be raised or lowered for the vertical adjustment of the rearward end of the frame. The hand lever 22 has a latch member 23 engaging a segment rack 24 whereby the parts may be retained in relatively adjusted position. The frame is provided with handles 25 whereby the machine may be guided, said handles being connected and spaced apart by a rung 26.

The side members of the frame 15 are provided with vertically adjustable standards 27, said standards having threaded portions 28 provided with nuts 29 whereby the said standards may be vertically adjusted and secured in various positions. Said standards are provided at the lower ends thereof with shoes 30 connected therewith by pivot members 31. Longitudinally disposed and forwardly divergent brushes 32 are secured at their rearward ends to the shoes 30, the forward ends of said brushes being similarly secured to shoes 33 which are connected by pivot members 34 with the lower ends of standards 35, each of said standards consisting of two parts which are connected together by a hinge 36 whereby the forward ends of the brushes are permitted to swing outwardly to permit said brushes to pass obstructions of any kind. Each of the standards 35 is provided with a spring 37 engaging the break joint formed by the hinge 36 in such a manner that the brush will be normally pressed in a downward direction. It is obvious that the pivot joint 31 should be sufficiently loose to permit the operation of the joint formed by the hinge 36 without danger of breakage.

The upper ends of the standards 35 are connected with cranks 38 extending from a rock shaft 39 having an upwardly extending arm 40, the upper end of which is connected with one end of an operating rod 41, the rearward end of said operating rod being provided with a rack 42, adapted to engage the rung 26, thereby enabling the rock shaft to be maintained in position at various adjustments. It is evident that by rocking the shaft 39 the forward ends of the brushes 32 may be raised or lowered as may be required.

The frame of the machine is provided intermediate the front and rear wheels with bearings 43 supporting a shaft 44 which carries a picker drum $d$. The picker drum as shown, has a cylindrical surface composed of flexible slats or staves 45, said slats or staves being provided with slots 44' near the ends thereof for the passage of headed pins or bolts 45' which are secured on annular end members 46 supported by arms or spokes 47 radiating from hubs 48. By this construction the slats or staves 45 will be permitted to flex upwardly as may be rendered necessary by irregularities in the surface of the ground when contacting therewith. Within this cylindrical barrel-like structure is mounted an inflatable cushion C of annular form, the outer wall of said cushion being adapted to impinge on the inner faces of the slats 45. The slats are apertured for the passage of curved teeth or prongs 75 which are movable radially through the slats, said prongs being provided at their inner ends with flat heads 76 abutting on the external surface of the cushion C. The latter has been shown as being provided with a valve 46' to enable it to be inflated with air to the desired extent. Within the scope of the invention however, the cushion may be filled with a resilient packing of fibrous or other material as indicated in Fig. 6. The prongs or teeth will be obviously forced outwardly through the slats by the action of the resilient cushion and when the machine is in operation the prongs will serve to pick up infested leaves and squares that lie in the path of the drum, the prongs that actively engage such leaves or squares being capable of yielding inwardly as will be readily understood.

Supported on the frame 15 in advance of the drum D is a shaft 49 carrying a brush cylinder 50 which serves to wipe the curved teeth 75 of the drum so as to detach therefrom, the punctured squares and leaves which are picked up thereby, such squares and leaves being thrown forwardly over a deflector 51 whereby they are guided into a receptacle 52 consisting of a drawer which is movably supported on cleats 53. The shaft 49 is driven by means of a transmission chain 54 from a countershaft 55 having a spur wheel 56 meshing with a spur wheel 57 on a shaft 58 which receives motion by a transmission chain 59 from the front axle 16. By this simple transmission mechanism the parts will be driven in the proper direction, and the speed may be regulated by properly proportioning the parts.

From the foregoing description taken in connection with the drawings hereto annexed, it will be readily seen that when the machine is drawn over the ground between the rows of plants, the punctured squares and leaves which have dropped to the ground will be gathered by the brushes 32 and laid in the path of the drum D, the teeth or prongs of which serve to pick up the squares and leaves which will be presently detached by the brush cylinder 50 and thrown over the deflector 51 into the receptacle 52 from which they may be subsequently removed and destroyed. The brushes are supported in such a manner that the forward ends thereof may be raised or lowered to adapt the said brushes to the conformation of the hills or ridges to be engaged thereby, and by providing the forward standards of the brushes with break joints, injury will be prevented in the event of obstacles being encountered. In like manner, the construction of the drum D with its inflated cushion and resiliently supported picker teeth or prongs will insure the constant and successful operation thereof without liability of injury. When the machine is to be transported over the ground, the rearward end of the frame may be raised or elevated so as to disengage the picker drum from the ground. The general construction of the machine is simple and it has been found to be thoroughly efficient for the purposes for which it is provided.

I claim:—

1. In a machine of the class described, a pair of forwardly divergent ground engaging brushes and front and rear standards whereby said brushes are supported, the forward standards being provided with break joints and with springs whereby the forward ends of the brushes are forced in a downward direction.

2. In a machine of the class described, the combination with a carrying frame of forwardly divergent ground engaging brush members, a picker drum located to the rearward of said brush members, said picker drum including an inflated cylindrical cushion, longitudinal slats supported adjacent thereto and curved teeth guided through the slats and having heads impinging on the inflated cushion.

3. In a machine of the class described, the combination with a carrying frame of forwardly divergent ground engaging brush members, a picker drum located to the rearward of said brush members, said picker drum including an inflated cylindrical cushion, longitudinal slats supported adjacent thereto and curved teeth guided through the slats and having heads impinging on the inflated cushion, and a driven brush cylinder engaging the prongs of the picker drum to disengage material therefrom.

4. A machine of the class described, a picker drum comprising a cylindrical barrel-like structure having longitudinal slats or staves, prongs operating through said staves and having flat heads at their inner ends, and an inflatable cylindrical cushion within the drum and engaging the heads of the prongs to force the latter in an outward direction.

5. In a machine of the class described, a picker drum comprising a cylindrical barrel-like structure having longitudinal flexible slats or staves, prongs operating through said staves and having flat heads at their inner ends, and a cylindrical cushion within the drum and engaging the heads of the prongs to force the latter in an outward direction.

In testimony whereof I affix my signature.

WILLIAM J. WALKER.

Copies of this patent may be obtained for five cents each, by addressing the "Commissioner of Patents, Washington, D. C."